(12) United States Patent
Kumar

(10) Patent No.: US 7,228,411 B1
(45) Date of Patent: Jun. 5, 2007

(54) METHOD AND APPARATUS TO USE-VOLATILE READ/WRITE MEMORY FOR BOOTSTRAP CODE AND PROCESSES BY RELOCATING WRITE INSTRUCTIONS

(75) Inventor: Jainendra Kumar, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 70 days.

(21) Appl. No.: 10/806,721

(22) Filed: Mar. 22, 2004

Related U.S. Application Data

(63) Continuation of application No. 09/751,348, filed on Dec. 27, 2000, now Pat. No. 6,728,876.

(51) Int. Cl.
*G06F 9/445* (2006.01)
(52) U.S. Cl. ............................................ 713/2
(58) Field of Classification Search ............... 713/2, 713/1
See application file for complete search history.

(56) References Cited

U.S. PATENT DOCUMENTS

| 4,805,109 A | 2/1989 | Kroll et al. ............. 364/464.02 |
| 5,465,338 A | 11/1995 | Clay ............................ 395/310 |
| 5,596,713 A * | 1/1997 | DeRoo et al. ................. 714/35 |
| 5,778,070 A | 7/1998 | Mattison ....................... 380/25 |
| 5,809,515 A * | 9/1998 | Kaki et al. ................... 711/103 |
| 6,510,495 B1 | 1/2003 | Nobukiyo ..................... 711/143 |
| 6,604,195 B1 | 8/2003 | Kumar et al. ................... 713/2 |

* cited by examiner

*Primary Examiner*—James K Trujillo
*Assistant Examiner*—Eric Chang
(74) *Attorney, Agent, or Firm*—Sierra Patent Group, Ltd.

(57) ABSTRACT

A method and apparatus for significantly reducing the number and types of non-volatile memory used on a typical motherboard is disclosed. While there are typically three or more types of non-volatile memory used to support the CPU during system boot and initialization, the present invention uses only one. This allows for a significant savings in materials cost and design effort.

14 Claims, 4 Drawing Sheets

METHOD AND APPARATUS TO USE-VOLATILE READ/WRITE MEMORY FOR BOOTSTRAP CODE AND PROCESSES BY RELOCATING WRITE INSTRUCTIONS

This application is a continuation of U.S. patent application Ser. No. 09/751,348, filed Dec. 27, 2000, now U.S. Pat. No. 6,728,876 incorporated by reference herein in its entirety.

BACKGROUND OF THE INVENTION

1. Field of the Invention

This invention pertains generally to computer systems. More particularly this invention is directed to an improved system and method for providing writable pseudo-devices while running the bootstrapping code during system initialization, and similar uses.

2. The Prior Art

The bootstrapping, or boot up, process of any computer system is well known in general. From a top level architectural view, the steps and devices used are the same if the computer system is a general purpose PC-like machine or an embedded system.

Someplace on the system there must reside a small program in a non-volatile memory device that is accessible by the processor, after the processor does its own power-up self test. As part of its own initialization, the processor will load a specified address into the program counter. The processor then attempts to get the value from the address that the program counter is pointing to. This is the first instruction in what is usually a very compact program that starts configuring the system as a whole, the bootstrap program.

After the system configuration gets to a certain point, the bootstrap or boot program turns control of the system over to the kernel of the operating system, which continues to bring the system up. In all cases the bootstrap or boot program must have another area of non-volatile memory from which to read system initialization (configuration) data so that the processor can establish communications with devices in the system. The result of this is that a fair amount of relatively expensive non-volatile memory must be dedicated to the boot code and the bootstrapping process.

While the system is booting, however, it also needs read/write memory as well read-only memory. Thus, systems end up using several memory types in a single implementation, which may include: ROM—for storing the bootstrap program; EEPROM—for storing system initialization and configuration information needed during the booting process;

Other Non-volatile R/W memory—for storage of larger programs such as an operating system or an operating system kernel; and, DRAM—volatile memory for general use.

This combination of different memory types places a design cost and uses considerable real estate on system boards. Because of this, there has been a long felt need to reduce the complexity of the system as it relates to boot strapping support; in particular anything that can reduce the amount and number of memories would be a significant improvement.

BRIEF DESCRIPTION OF THE INVENTION

The present invention discloses a method and apparatus that reduces the types of memory devices needed from four or more to only two. The two memory devices kept are the traditional DRAM plus one non-volatile read/write memory device. In one preferred embodiment the non-volatile read/write memory device is a flash memory.

The single non-volatile read/write memory device holds the bootstrap code, the system initialization and configuration data, and the operating system or operating system kernel. When the CPU is executing bootstrap code, operating system code, or reading configuration or initialization data and a write instruction is encountered, the system does not immediately start to execute the write. Instead, the portion of the executing code that is responsible for the write operation is relocated to another device available to the CPU, then the CPU PC is set to start executing instructions from the new location. The non-volatile read/write memory is put into write-only mode, the write is made, and the non-volatile memory is then switched back into read-only mode. The executing instructions now do a jump back to the instruction just after the write, and execution continues from the non-volatile read/write memory device.

BRIEF DESCRIPTION OF THE DRAWING FIGURES

DETAILED DESCRIPTION OF PREFERRED EMBODIMENTS

Person of ordinary skill in the art will realize that the following description of the present invention is illustrative only and not in any way limiting. Other embodiments of the invention will readily suggest themselves to such skilled persons having the benefit of this disclosure.

The present invention addresses the need to reduce the amount and types of memory needed to support the booting process by providing a way to continue to use non-volatile read/write memory as a read device while the same non-volatile memory is being written.

As is well known in the art, non-volatile read/write memory, excluding mass storage devices such as disk drives, has the characteristic that it must be in either write mode or in read mode, but not both at the same time. This has previously prevented it from being used as an active storage mechanism while simultaneously being the device from which the current program is being run. If that combination were to be attempted, it could easily be the case that a program would attempt to store data in memory, causing the non-volatile read/write memory to be put into write mode. Then, the processor would attempt to retrieve the next instruction in the current instruction stream but would be blocked because the memory is in write-only mode. The processor would stall, as would the system; it would be effectively deadlocked. This must be avoided. In the past, the problem has been avoided by never using the memory for both reading and writing. As discussed above, however, that leads to a proliferation of memory types needed on the main system or mother board.

Figure 1:
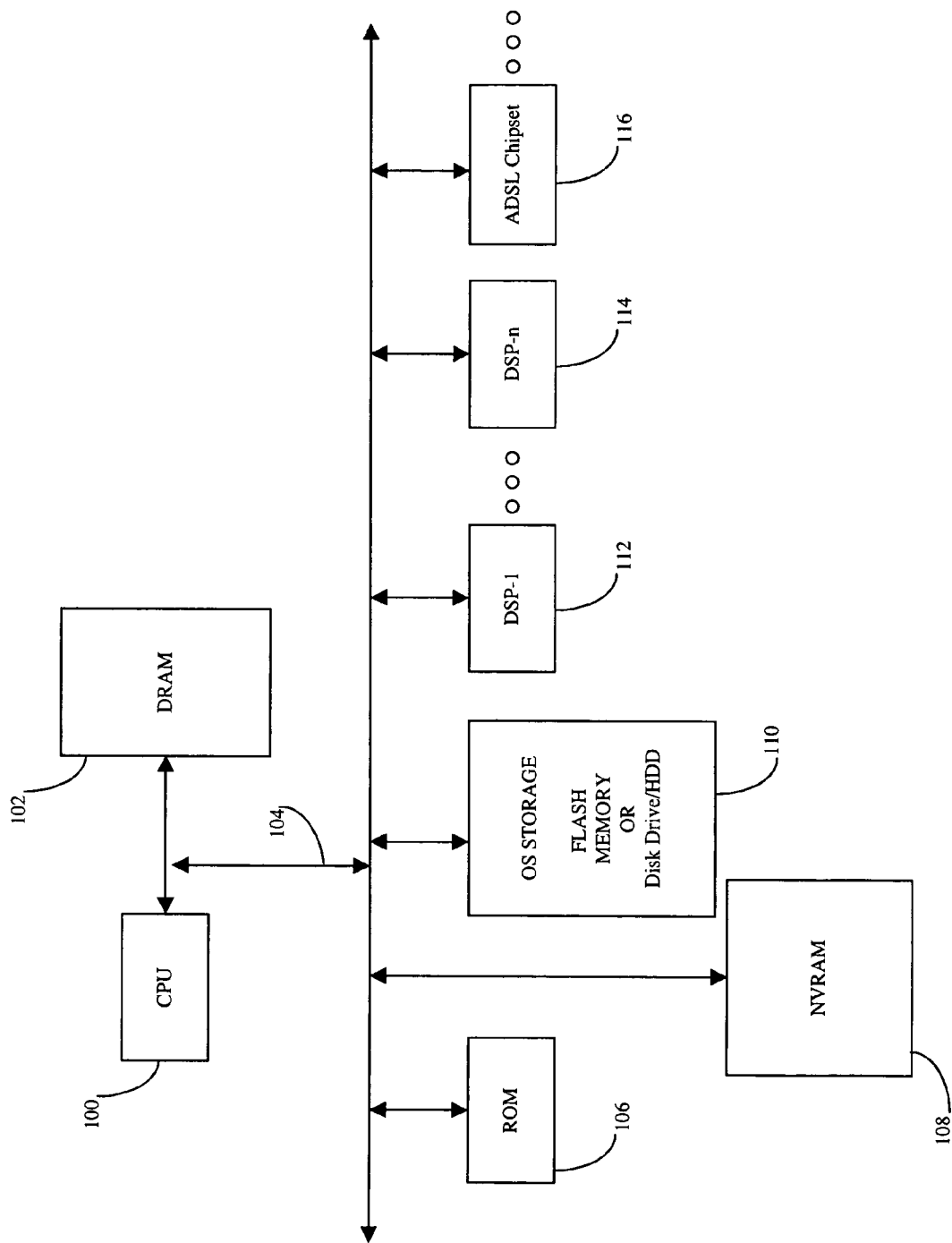
FIG. 1 is a block diagram of prior art use of memory devices.

FIG. 1 shows a typical prior art configuration. CPU 100 is connected to devices on the mother board (or, on the same local bus) through CPU bus 104. DRAM 102 is the normal volatile read/write memory used by the CPU during normal system execution. NVRAM 108 typically contains configuration and/or initialization data needed by the CPU during booting to configure the system, used to bring system components up in a known state and initializing communications between each component. It may also contain configuration data used by the system once the system is fully operational. ROM 106 contains the bootstrap code; the first code executed after initial power-up and self-test of the CPU. Memory device 110 contains the operating system. Depending on the size and use of system, device 110 may be a hard disk device or another non-volatile read/write memory type such as flash memory. Also shown are a few other typical components on a local bus such as a plurality of DSPs, shown as DSP-1 112 through DSP-n 114, and ADSL chipset 116. Ellipses indicate other components can be on the bus as well.

Figure 2:
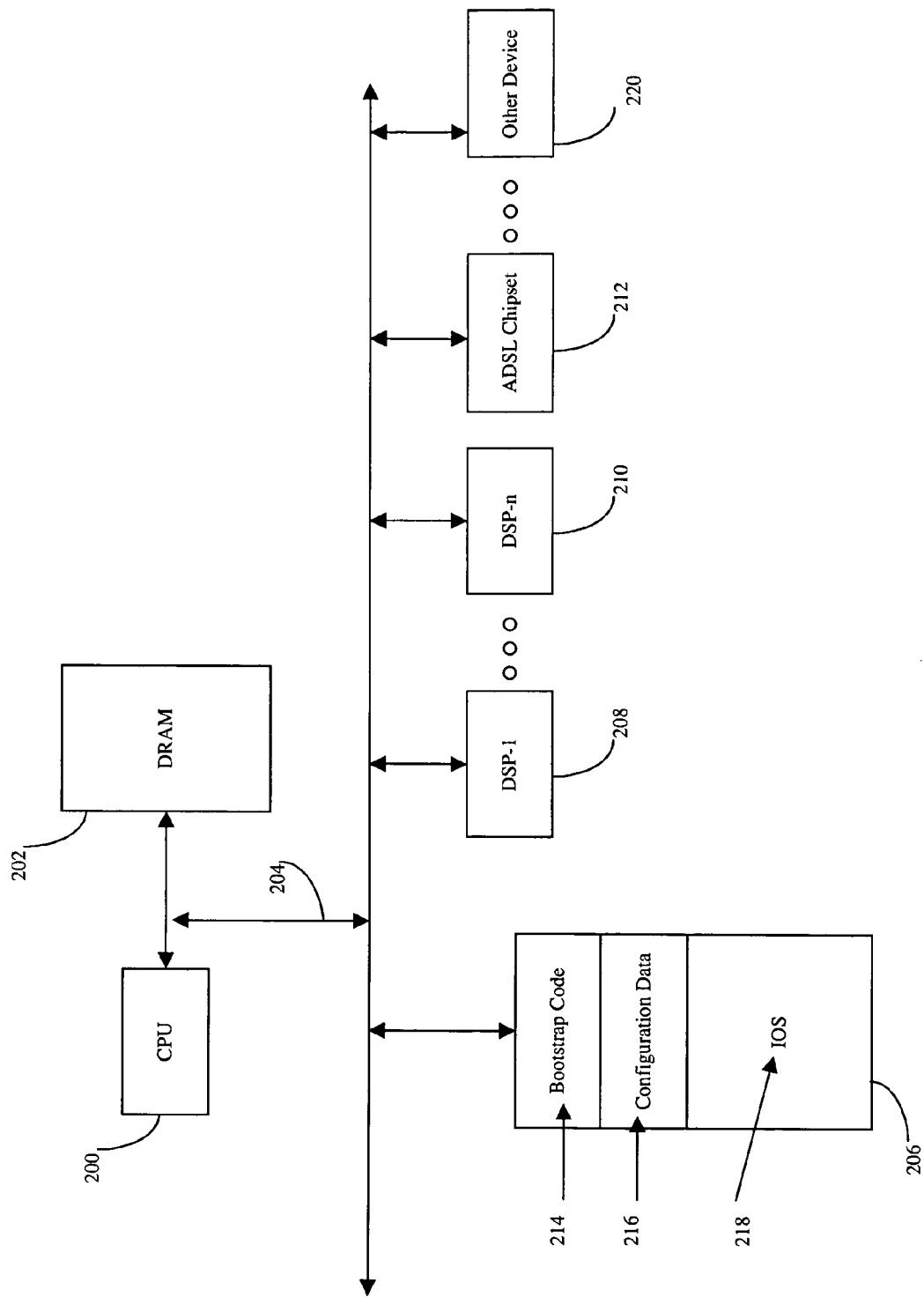
FIG. 2 is a block diagram of memory devices according to the present invention.

FIG. 2 shows memory devices according to one embodiment of the present invention. CPU 200 is connected to local CPU bus 204, through which the CPU can address various devices. DRAM 202 is traditional read/write volatile primary memory, and DSP-1 208 through DSP-n 210 and the ADSL chipset 212 are components usually found operably connected to the CPU's local bus in many systems. Other device 220 is shown to indicate there are numerous other devices, chipsets, etc., that may be attached to local CPU bus 204 and which are well known in the art. Unlike the prior art which had a mix of at least three non-volatile read/write and read-only memory devices, the present invention only has one non-volatile read/write memory device, shown as memory device 206.

Memory device 206 would typically be flash memory, although any non-volatile read/write memory could be used. Also shown is memory device 206's internal configuration, comprising bootstrap code 214, configuration data 216, and an operating system (shown in this case as Cisco's IOS operating system) 218. For the purposes of this disclosure, when discussing "configuration data" such as configuration data 216, it is to be understood to include system initialization data as well.

Memory device 206 can be used in several ways during system initialization and operation. During system boot and initialization, CPU 200 executes bootstrap code 214 and uses configuration data 216 as needed. After the system boot process has progressed to the point where the system components are known and the operating system kernel can take over, bootstrap code 214 will execute a jump instruction to enter the operating system code base, 218.

CPU 200 will start executing code from the operating system code base, shown as IOS 218. At this point, depending on the overall system configuration and architecture, some, none, or most of the operating system IOS 218 may be read into DRAM 202. Although this disclosure focuses on implementations where CPU 200 executes system code from IOS 218, it is fully contemplated that the inventive features of the current invention encompass distributed implementations, including any combination of operating system code that runs in any combination of memory device 206, DRAM 202, and other available memory. Various combinations will come to mind to those of ordinary skill in the art with the benefit of the present disclosure.

Figure 3:
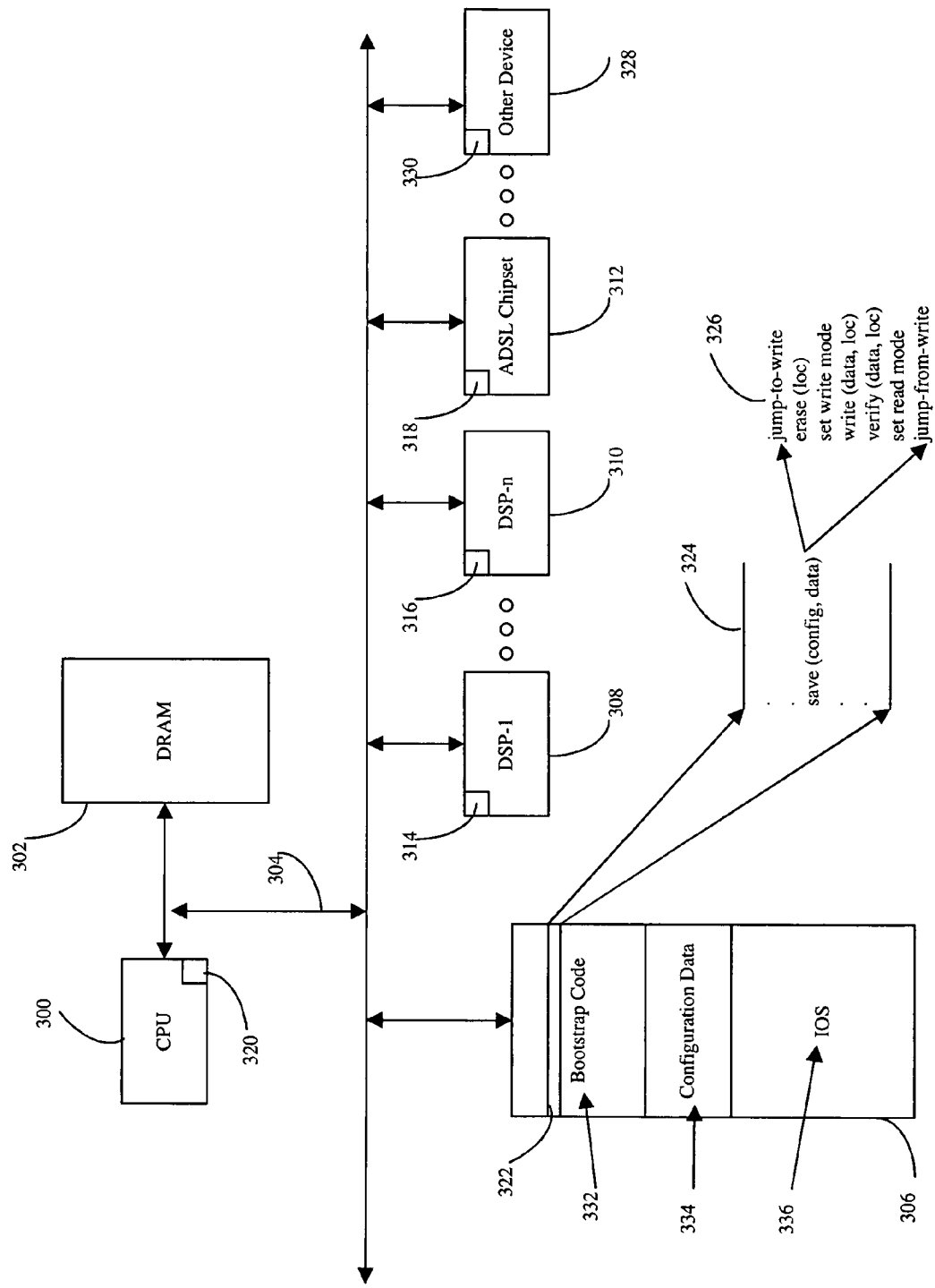
FIG. 3 is a block diagram showing memory devices in use according to the present invention.

FIG. 3 shows memory device configurations in use according to one embodiment of the current invention. CPU 300 is communicating with system components over local CPU bus 304. DRAM 302 is normal primary read/write (volatile) memory for use by CPU 300. The CPU itself has some small amount of read/write memory it can use for different purposes and is generally addressable (i.e., is a part of the CPU's address space), shown as memory space 320.

Each of DSP-1 308, DSP-n 310, and ADSL chipset 312 are shown as having CPU accessible and addressable address spaces. DSP-1 308 has CPU 300 accessible address space 314, DSP-n 310 has CPU 300 accessible address space 316, ADSL chipset 312 has CPU 300 accessible address space 318, and other device 328 has CPU 300 accessible address space 330.

DSPs 308 and 310 may have any number of other similar devices between them, shown as ellipses between the components. In addition to the DSPs and the ADSL chipset 312, other device 328 is shown as an exemplar of other devices that may be attached to CPU local bus 304. The fact that similar devices may be attached to the CPU local bus is shown by the ellipses between ADSL chipset 312 and other device 328. As will be apparent to one of ordinary skill in the art and with the benefit of the present disclosure, there are any number of devices that may be attached to local CPU bus 304; all such devices are contemplated by the current invention and fully within the inventive nature of the present disclosure.

For the sake of clarity in the figures, each of the devices shown attached to local CPU bus 304 has a portion of read/write (volatile) memory that is accessible by CPU 300 (is mapped into the CPU's address space).

As will be obvious to a person of ordinary skill in the art and with the benefit of the present disclosure, there are a wide number of ways in which a particular system may be implemented. Such variations include the attachment of a wide range of standard and well known devices to the CPU bus. Each of the attached devices may have a portion of their address spaces available to (in the address space of) the CPU or some may and some may not. Also included are configurations where a plurality of the same devices are attached to the CPU bus, and where only a subset of such devices are implemented such that they have a portion of their volatile memory mapped into the address space of the CPU (readable/writable by the CPU). All such possible configurations are contemplated by the current invention.

Memory device 306 is shown in the situation where CPU 300 is executing bootstrap code 332. IOS 336 has not yet been started (executed). Having reached a portion of the bootstrap code designated as 322, a "save" instruction is encountered in the code stream. This is shown in code segment 324, and is a pseudo-code statement. There are two parameters "config" and "data". "Config" stands for a set of configuration or initialization parameters having a specified location in configuration data 334. There are numerous reasons why some configuration data may need to be written into configuration data 334 in addition to the normal situation when bootstrap code 332 is reading configuration data 334 as it configures and initializes the system. One such case would be where bootstrap code 332 found a new or changed device plugged into the local CPU bus 304. The system would need to configure itself differently depending on the actual units (devices, components) detected by bootstrap code 332. In addition, there would typically be a set of parameters calculated for the devices as found (including shared memory space, etc.) that would be calculated, changed, and recorded in configuration data 334.

In addition to the case shown where bootstrap code 332 is making changes to configuration data 334, it can also be the case that when CPU 300 is executing code from IOS 336, changes to configuration data 334 will also occur. A typical scenario would be the case when an external configuration occurs in a network, and triggers the need to record the change in the non-volatile configuration data 334. In such a situation memory device 306 needs to be in write mode (thereby blocking reads), but is also the device from which the current program is being executed by CPU 306.

Referring again to pseudo-code statement 324, the actual lower-level actions that must be carried out to save the configuration data is shown as pseudo-code segment 326. To carry out the write sequence, the CPU will execute code that has been located in one of the other devices that are in CPU 300's address space. This is indicated in the first and last line of pseudo-code sequence 326 by the jump statements. The method for using the memory devices in this is way is described in more detail in the next paragraph.

Figure 4:
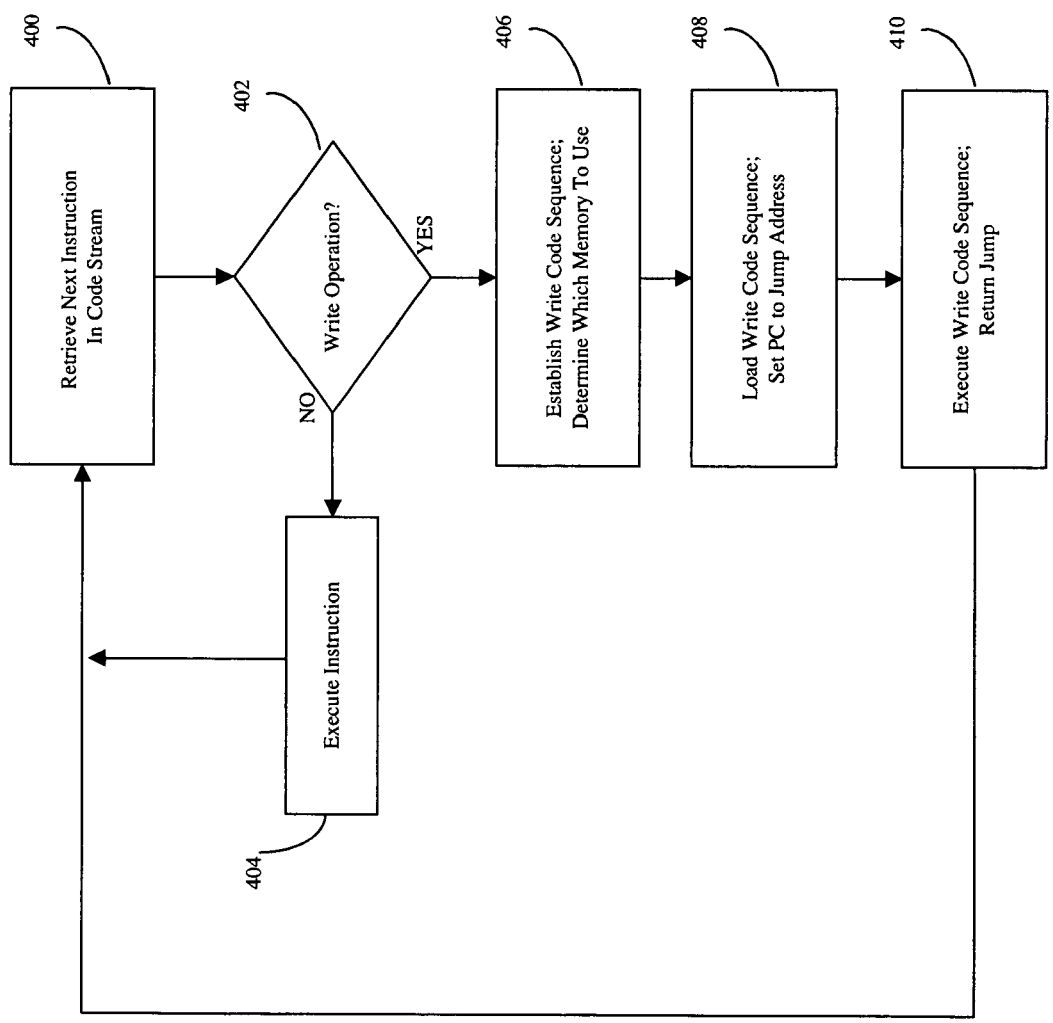
FIG. 4 is a flow chart according to the present invention.

Referring now to FIG. 4, a method of using the memory devices according to the present invention is shown. While executing a code stream that resides in a non-volatile memory device, the CPU will retrieve a next instruction, shown as box 400. Box 400 is then left and decision point 402 entered. There, the instruction is checked to see if it is a write instruction or not. If the instruction is not a write instruction, decision point exit "NO" is taken to box 404.

The action taken in box 404 is to execute the current instruction, then leave box 404 and proceed back to box 400. In box 400 the next instruction is retrieved, and the process continues until the end of the program.

Returning to decision point 402, if the instruction is a write operation the "YES" exit is taken to box 406. In box 406 the write code sequence is established, that is, the code sequences (lines of code) that are going to be executed by the CPU to do the actual write operation. After that, the available volatile memory locations are identified, and one is picked as the location to use for this particular operation. Box 406 is now left for box 408.

In box 408 the write code sequence (lines of code) identified in box 406 are loaded into the volatile memory also identified in box 406. The amount of space actually used is typically very small—often less than 1 Kb. After the code sequence is loaded, the CPU PC is loaded with the address of the first instruction to execute of the relocated code. Box 408 is now left for box 410.

In box 410, the CPU executes the relocated code sequence now located in volatile read/write memory. During this sequence, the non-volatile read/write memory will be put into write-only mode, the data to be saved written into the designated locations, and the non-volatile memory then put back into read-only mode. After the non-volatile read/write memory is in read-only mode, the CPU PC is loaded with the address of the next instruction to execute in the non-volatile memory device. Box 410 is left and box 400 re-entered.

In box 400, the next instruction is retrieved and the process continues until the end of the code is reached. The method just described is included within what is called the non-volatile memory management system. The memory management system is comprised of all the components, be they software, firmware, microcode, hardware, etc., that are needed to implement and carry out the just described functionality. As will be apparent to a person of ordinary skill in the art and with the benefit of the present disclosure, there will be any number of ways of specifically implementing the system just described. A preferred embodiment will implement most of the just described functionality in machine code and in microcode, where the machine code that supports the described functionality will be generated partly by an optimizing compiler for systems embodying the current invention, and partly by programmers who write the bootstrapping code and low-level portion of the operating system code.

The present invention has been partially described through the use of a flow chart. As is appreciated by those of ordinary skill in the art and with the benefit of the present disclosure, the procedures described herein may be repeated as continuously, as often, or as little as necessary to satisfy the needs described and details or order of steps may vary without departing from the basic concepts of the present invention.

While embodiments and applications of this invention have been shown and described, it will be apparent to those or ordinary skill in the art and with the benefit of the present disclosure that many more modifications than mentioned above are possible without departing from the inventive concepts contained herein. The invention, therefore, is not to be restricted except in the spirit of the associated claims.

What is claimed is:

1. In a data processing system having a CPU, a non-volatile read/write memory device in the CPU's address space, and at least one other device further having read/write memory in the CPU's address space, a method for executing an instruction stream using the read/write non-volatile memory device comprising:

for each instruction in the instruction stream:
(a) retrieving an instruction from said non-volatile read/write memory device;
(b) determining if said retrieved instruction is a write instruction;
(c) executing said retrieved instruction if said retrieved instruction is not a write instruction;
(d) loading instructions into memory mapped into said CPU's address space that is not in said non-volatile read/write memory device needed to carry out the write operation of said retrieved instruction, if said retrieved instruction is a write instruction;
(e) executing said loaded instructions, carrying out said write operation on said non-volatile read/write memory device thereby; and
(f) pointing to a next instruction to be executed.

2. The method for executing an instruction stream in claim 1 where said non-volatile read/write memory device is FLASH memory.

3. The method for executing an instruction stream in claim 1 where said instruction stream comprises boot code.

4. The method for executing an instruction stream in claim 1 where said instruction stream comprises a portion of an operating system.

5. The method for executing an instruction stream in claim 1 where said instruction stream comprises IOS.

6. The method for executing an instruction stream in claim 1 where step (f) further comprises writing system initialization data.

7. The method for executing an instruction stream in claim 1 where step (f) further comprises writing configuration data.

8. A program storage device readable by a machine, tangibly embodying a program of instructions executable by a machine for executing an instruction stream where the program storage device is a non-volatile read/write memory device, and where the machine further comprises at least one other device having read/write memory addressable by the machine, the method comprising:

for each instruction in the instruction stream:
retrieving an instruction from said non-volatile read/write memory device;

determining if said retrieved instruction is a write instruction;

executing said retrieved instruction if said retrieved instruction is not a write instruction;

loading instructions into memory mapped into said CPU's address space that is not in said non-volatile read/write memory device needed to carry out the write operation of said retrieved instruction, if said retrieved instruction is a write instruction;

executing said loaded instructions, carrying out said write operation on said non-volatile read/write memory device thereby; and pointing to a next instruction to be executed.

9. The program storage device of claim 8 where said non-volatile read/write memory device is FLASH memory.

10. The program storage device of claim 8 where said instruction stream comprises boot code.

11. The program storage device of claim 8 where said instruction stream comprises a portion of an operating system.

12. The program storage device of claim 8 where said instruction stream comprises IOS.

13. The program storage device of claim 8 where said writing step further comprises writing system initialization data.

14. The program storage device of claim 8 where said writing step further comprises writing configuration data.

* * * * *